(12) United States Patent
Park et al.

(10) Patent No.: US 9,417,468 B2
(45) Date of Patent: Aug. 16, 2016

(54) TRANSMISSION TYPE HIGH-ABSORPTION OPTICAL MODULATOR AND METHOD OF MANUFACTURING THE SAME

(71) Applicant: SAMSUNG ELECTRONICS CO., LTD., Suwon-si (KR)

(72) Inventors: Changyoung Park, Yongin-si (KR); Byunghoon Na, Suwon-si (KR); Yonghwa Park, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/677,027

(22) Filed: Apr. 2, 2015

(65) Prior Publication Data

US 2016/0018676 A1   Jan. 21, 2016

(30) Foreign Application Priority Data

Jul. 18, 2014   (KR) .................. 10-2014-0091313

(51) Int. Cl.
- *G02F 1/035* (2006.01)
- *G02F 1/017* (2006.01)
- *G02B 6/124* (2006.01)
- *G02F 1/015* (2006.01)

(52) U.S. Cl.
CPC ............ *G02F 1/01716* (2013.01); *G02B 6/124* (2013.01); *G02F 1/01708* (2013.01); *G02F 2001/0155* (2013.01)

(58) Field of Classification Search
CPC .......... G02B 2006/12128; G02F 2001/01733; G02F 2001/01758; H01S 5/125; H01S 5/187; G01J 3/18; G01J 3/1895

USPC ........... 385/2; 372/43–45, 96, 50.124; 257/13
See application file for complete search history.

(56) References Cited

U.S. PATENT DOCUMENTS

| | | | |
|---|---|---|---|
| 6,201,825 B1 * | 3/2001 | Sakurai .................. | B82Y 20/00 257/13 |
| 6,240,114 B1 | 5/2001 | Anselm et al. | |
| 6,711,195 B2 * | 3/2004 | Chang .................... | B82Y 20/00 372/45.01 |

(Continued)

FOREIGN PATENT DOCUMENTS

| | | |
|---|---|---|
| JP | 2000133883 A | 5/2000 |
| JP | 2013009013 A | 1/2013 |

(Continued)

OTHER PUBLICATIONS

Park et al., "Micro optical system based 3D imaging for full HD depth image capturing", 15 pages total, SPIE Proceedings vol. 8252, MOEMS and Miniaturized Systems XI, Feb. 16, 2012.

*Primary Examiner* — Ellen Kim
(74) *Attorney, Agent, or Firm* — Sughrue Mion, PLLC

(57) ABSTRACT

Provided are a transmission type high-absorption optical modulator and a method of manufacturing the transmission type high-absorption optical modulator. The optical modulator includes: a substrate; a lower distributed Bragg reflector (DBR) layer on the substrate; a lower clad layer on the lower DBR layer; an active layer that is formed on the lower clad layer and includes a quantum well layer and a quantum barrier layer; an upper clad layer on the active layer; an upper DBR layer on the upper clad layer; and a doping layer that supplies carriers to the quantum well layer. In the optical modulator, the doping layer may be included in the quantum barrier layer or in at least one of the upper and lower clad layers.

17 Claims, 11 Drawing Sheets

(56) References Cited

U.S. PATENT DOCUMENTS

| | | | |
|---|---|---|---|
| 2007/0030874 A1* | 2/2007 | Ariga | B82Y 20/00 372/50.124 |
| 2010/0102295 A1 | 4/2010 | Wang et al. | |
| 2010/0308211 A1 | 12/2010 | Cho et al. | |
| 2011/0133156 A1* | 6/2011 | Won | H01L 33/06 257/13 |
| 2011/0181936 A1 | 7/2011 | Cho et al. | |
| 2012/0107991 A1 | 5/2012 | Huang et al. | |
| 2012/0162380 A1 | 6/2012 | Cho et al. | |
| 2012/0236892 A1* | 9/2012 | Johnson | B82Y 20/00 372/45.01 |
| 2014/0166977 A1* | 6/2014 | Shur | H01L 33/04 257/13 |

FOREIGN PATENT DOCUMENTS

| | | |
|---|---|---|
| KR | 10-0362060 B1 | 11/2002 |
| KR | 100476567 B1 | 3/2005 |

\* cited by examiner

TRANSMISSION TYPE HIGH-ABSORPTION OPTICAL MODULATOR AND METHOD OF MANUFACTURING THE SAME

RELATED APPLICATION

This application claims priority to Korean Patent Application No. 10-2014-0091313, filed on Jul. 18, 2014 in the Korean Intellectual Property Office, the disclosure of which is incorporated herein in its entirety by reference.

BACKGROUND

1. Field

Apparatuses and methods consistent with exemplary embodiments relate to optical modulators, and more particularly, to a transmission type high-absorption optical modulator and a method of manufacturing the same.

2. Description of the Related Art

Three-dimensional (3D) photography and 3D displays have become very popular issues in the display industry and the application of these technologies has extended to sensors and game machines.

Unlike a stereo type 3D image representation method, data for 3D image representation using depth information also includes distance information and thus may be used not only for 3D displays but also for precision measurement devices or sensors.

A 3D depth sensor using an infrared (IR) light source adjusts IR transmittance by changing the voltage of a transmission type optical modulator and senses depth based on a change in light transmittance. A variation is generated in the absorption ratio of a transmission type optical modulator based on whether the voltage is on or off (Von/Voff), and a shutter for the IR light source may be opened or closed based on the variation. An optical modulator in a 3D camera is referred to as an optical shutter. A depth image may be obtained by using a CMOS image sensor (CIS) with an IR optical signal that is modulated by using an optical modulator operating at an alternating current (AC) of 20 MHz.

An optical modulator may be used as an image type distance sensor that captures an image of an object like a photographic image in order to provide distance data for every part of a screen. An optical modulator may be used in devices in a variety of fields. For example, an optical modulator may be used in precision measurement equipment, sensors for safety or convenience inside and outside vehicles, camera auto-focusing, sensors for closed circuit TVs (CCTVs) for crime prevention, 3D object surface printing, 3D broadcasting cameras, 3D endoscope cameras, distance sensors for improving the accuracy of military missiles, etc. The possible applications of optical modulators range from daily use purposes to military purposes.

SUMMARY

One or more exemplary embodiments may provide optical modulators having an increased light absorption ratio due to an increased carrier supply.

One or more exemplary embodiments may provide methods of manufacturing the optical modulators.

Additional exemplary aspects and advantages will be set forth in part in the description which follows and, in part, will be apparent from the description, or may be learned by practice of the presented embodiments.

According to an aspect of an exemplary embodiment, transmission type high-absorption optical modulator includes: a substrate; a lower distributed Bragg reflector (DBR) layer on the substrate; a lower clad layer on the lower DBR layer; an active layer that is formed on the lower clad layer and includes a quantum well layer and a quantum barrier layer; an upper clad layer on the active layer; an upper DBR layer on the upper clad layer; and a doping layer that supplies carriers to the quantum well layer.

The quantum barrier layer may include the doping layer.

At least one of the upper and lower clad layers may include a doping layer.

The active layer may be a multi-quantum well layer including a plurality of quantum well layers and a plurality of quantum barrier layers and may have a rectangular quantum well (RQW) structure, a 3-asymmetric-coupled quantum well (3ACQW) structure, or a 3-coupled quantum well (3CQW) structure.

At least two of the plurality of quantum barrier layers may each include a doping layer.

The doping layer may have a thickness (t) in a range of 0<t<1.8 nm and does not contact the quantum well layer.

A doping density of the doping layer may be from about $5 \times 10^{15}/cm^3$ to about $1 \times 10^{20}/cm^3$.

The doping layer may be doped with a p-type dopant or an n-type dopant.

According to an aspect of another exemplary embodiment, a method of manufacturing a transmission type high-absorption optical modulator includes: forming a lower distributed Bragg reflector (DBR) layer on a substrate; forming a lower clad layer on the lower DBR layer; forming, on the lower clad layer, an active layer including a quantum well layer and a quantum barrier layer; forming an upper clad layer on the active layer; forming an upper DBR layer on the upper clad layer; and forming a doping layer that supplies carriers to the quantum well layer.

The forming the quantum barrier layer may include forming the doping layer therein.

At least one of processes forming the lower clad layer and forming the upper clad layer may include forming a doping layer therein.

The doping layer may be a layer doped with a P-type dopant or an N-type dopant.

The forming of a quantum barrier layer may include: forming a first layer on the lower clad layer; forming the doping layer on the first layer; and forming a second layer on the doping layer.

The forming of the doping layer on the first layer may include supplying a p-type or n-type dopant onto the first layer together with a source gas used in the forming of the first layer.

The active layer may be a multi-quantum well layer including a plurality of quantum well layers and a plurality of quantum barrier layers and may have a rectangular quantum well (RQW) structure, a 3-asymmetric-coupled quantum well (3ACQW) structure, or a 3-coupled quantum well (3CQW) structure.

At least two of the plurality of quantum barrier layers may each include a doping layer.

The doping layer may have a thickness (t) in a range of 0<t<1.8 nm and does not contact the quantum well layer.

A doping density of the doping layer may be from about $5 \times 10^{15}/cm^3$ to about $1 \times 10^{20}/cm^3$.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
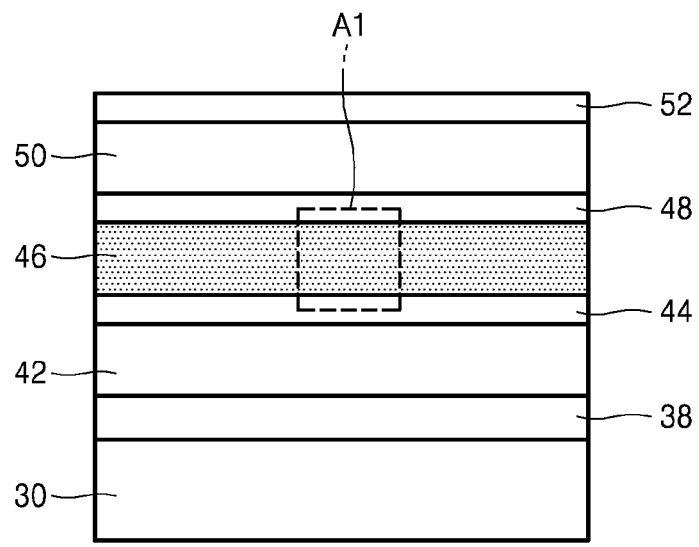
FIG. 1 is a cross-sectional view of an optical modulator according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of layers or areas are exaggerated for clarity of description.

First, a transmission type high-absorption optical modulator (hereinafter, "transmission type optical modulator") according to an exemplary embodiment will be described.

Referring to FIG. 1, the transmission type optical modulator includes a buffer layer 38 on a substrate 30. The substrate 30 may be a compound semiconductor substrate such as a GaAs substrate, but is not limited thereto. The buffer layer 38 may be, for example, a GaAs buffer layer. A lower distributed Bragg reflector (DBR) layer 42 is formed on the buffer layer 38. The lower DBR layer 42 may be formed of two different layers that have different refractive indices and are alternately stacked. A lower clad layer 44 is formed on the lower DBR layer 42. The lower clad layer 44 may be, for example, a GaAs layer, an InGaAs layer, an AlGaAs layer or a GaAsP layer. An active layer 46 is formed on the lower clad layer 44. The active layer 46 may be a multi-quantum well (MQW) layer. The active layer 46 may have a 0.5 nλ structure (where λ is a wavelength of incident light and is in a range of 780 nm≤λ≤1600 nm, and n=1, 2, 3 . . . ). The active layer 46 is where light absorption occurs and may include a doping area (doping layer). This will be described later. An upper clad layer 48 is formed on the active layer 46. The upper clad layer 48 may be, for example, a GaAs layer, an InGaAs layer, an AlGaAs layer or a GaAsP layer. An upper DBR layer 50 is formed on the upper clad layer 48. A contact layer 52 may be formed on the DBR layer 50. The contact layer 52 may be using for contacting a P-type electrode. A contact layer for an N-type electrode may be disposed under the lower DBR layer 42.

Figure 2:
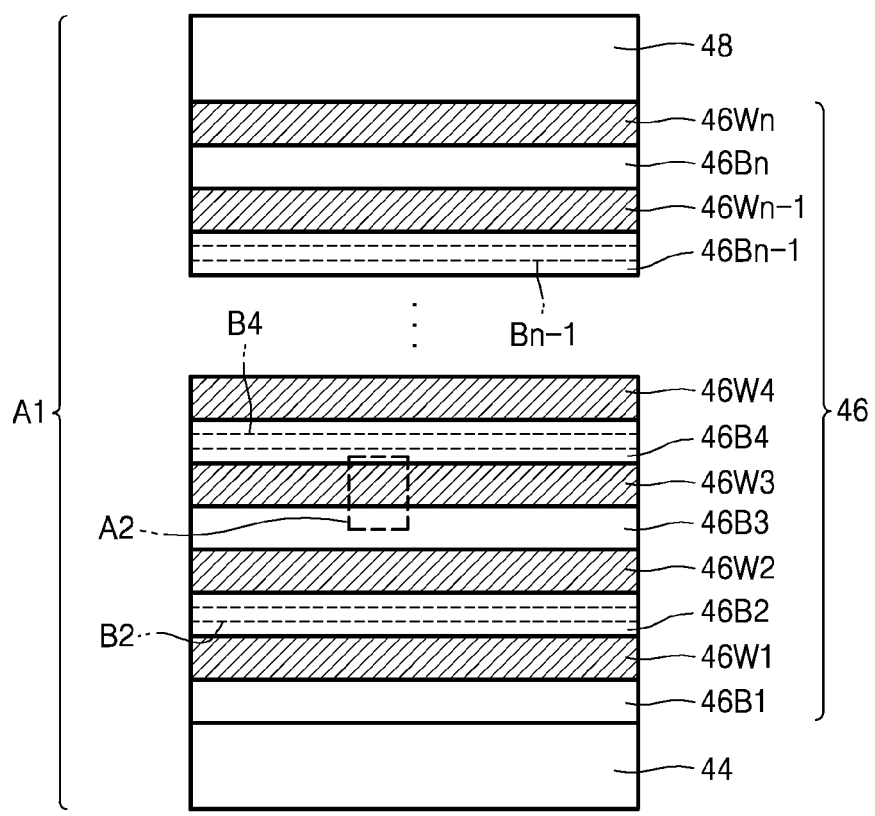
FIG. 2 is an extended cross-sectional view of a first area of FIG. 1.

FIG. 2 is an extended cross-sectional view of a first area A1 of FIG. 1.

Referring to FIG. 2, the active layer 46 may be formed by alternately and repeatedly stacking a quantum well layer and a quantum barrier layer.

In detail, a first quantum barrier layer 46B1 and a first quantum well layer 46W1 are sequentially stacked on the lower clad layer 44. The first quantum barrier layer 46B1 and the first quantum well layer 46W1 may be, for example, different compound semiconductor layers. The combination of the first quantum barrier layer 46B1 and the first quantum well layer 46W1 may be, for example, GaAs/AlGaAs, InGaAs/(GaAsP or InGaP or InGaAsP), or InAlGaAs/(GaAsP or InGaP or InGaAsP). A second quantum barrier layer 46B2 and a second quantum well layer 46W2 are sequentially stacked on the first quantum well layer 46W1. The second quantum barrier layer 46B2/the second quantum well layer 46W2 may be the same as the first quantum barrier layer 46B1/the first quantum well layer 46W1. A third quantum barrier layer 46B3 and a third quantum well layer 46W3 are sequentially stacked on the second quantum well layer 46W2. The third quantum barrier layer 46B3/the third quantum well layer 46W3 may be the same layer as the first quantum barrier layer 46B1/the first quantum well layer 46W1. A fourth quantum barrier layer 46B4 and a fourth quantum well layer 46W4 are sequentially stacked on the third quantum well layer 46W3. The fourth quantum barrier layer 46B4/the fourth quantum well layer 46W4 may be the same layer as the first quantum barrier layer 46B1/the first quantum well layer 46W1.

As described above, the active layer 46 may have a layer structure in which the first quantum barrier layer 46B1 and the first quantum well layer 46W1 are alternately and repeatedly stacked. As an uppermost layer of the active layer 46, an n-th quantum barrier layer 46Bn and an n-th quantum well layer 46Wn are sequentially formed, where n is 1, 2, 3, . . . . A thickness t2 of each of the quantum barrier layers 46B1 through 46Bn may be in a range of, for example, 2 nm≤t2≤30 nm. Also, a thickness t1 of each of the quantum well layers 46W1 through 46Wn may be in a range of, for example, 4 nm≤t1≤15 nm.

In the active layer 46 as described above, the second quantum barrier layer 46B2, the fourth quantum barrier layer 46B4, and an (n−1)th quantum barrier layer 46Bn−1 respectively include doping areas (doping layers) B2, B4, and Bn−1. A thickness t3 of the doping areas (doping layers) B2, B4, and Bn−1 may be 0<t3<1.8 nm. Also, the doping areas B2, B4, and Bn−1 and the quantum barrier layers 46W1, 46W2, 46W3, 46W4, and 46Wn−1 that are adjacent thereto are respectively spaced apart from each other, and a distance therebetween may be, for example, about 1.5 nm or about 2.5 nm.

The doping areas B2, B4, and Bn−1 may include an n-type dopant or a p-type dopant. The n-type dopant may be, for example, C, Si, S, Ge, Se, or Te. The p-type dopant may be, for example, Be, Mg, Zn, Si, or Ge. A doping density of the doping areas B2, B4, and Bn−1 may be, for example, about $5 \times 10^{15}/cm^3$ to about $1 \times 10^{20}/cm^3$.

While an active layer 46 including three or more doping areas (doping layers) B2, B4, and Bn−1 is illustrated in FIG. 2, the active layer 46 may include one or more doping areas; for example, the active layer 46 may include a fourth doping area B4.

Figure 4:
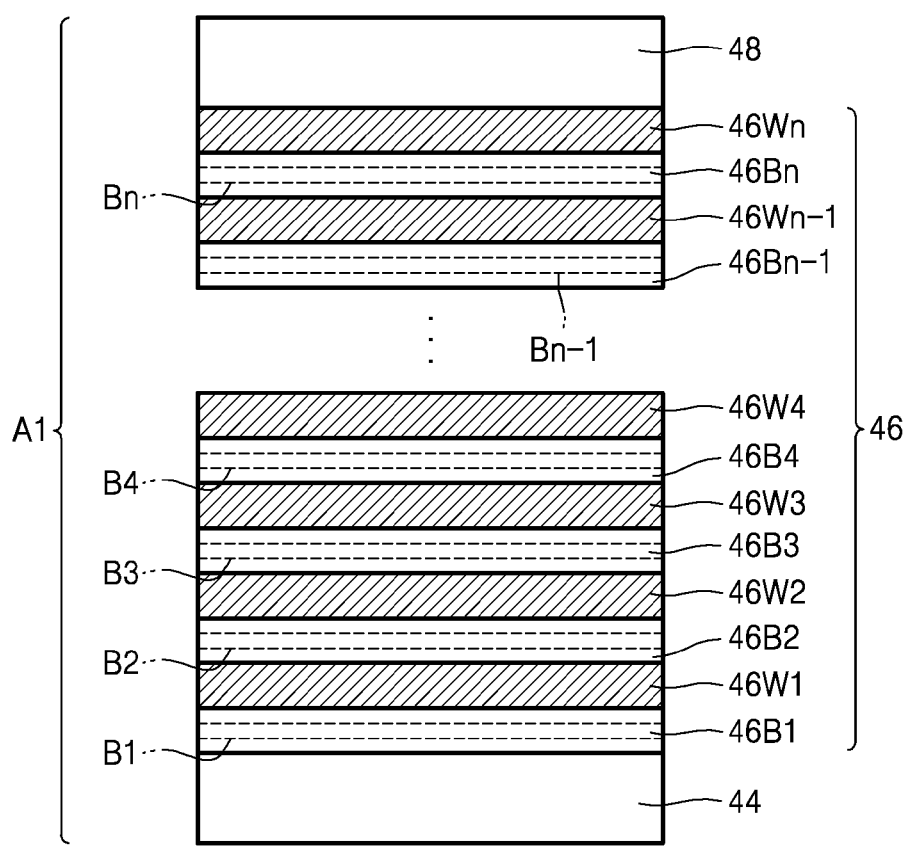
FIG. 4 is a cross-sectional view illustrating a doping area of FIG. 2 formed in the entire quantum barrier layer of an active layer (multi-quantum well layer)

Also, as illustrated in FIG. 4, the doping areas described above may be respectively included in the quantum barrier layers 46B1 through 46Bn−1.

Figure 3:
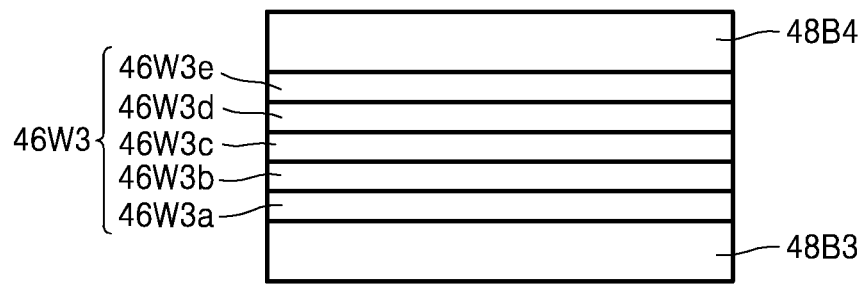
FIG. 3 is an extended cross-sectional view of a second area of FIG. 2.

FIG. 3 is an extended cross-sectional view of a second area A2 of FIG. 2.

Referring to FIG. 3, the third quantum well layer 46W3 includes first through fifth sub-quantum well layers 46W3a through 46W3e. The first and fifth sub-quantum well layers 46W3a and 46W3e may be formed of the same material, such as $In_{0.08}Ga_{0.92}As$. The second and fourth sub-quantum well layers 46W3b and 46W3d may be formed of the same material such as GaAs. An energy level of the third sub-quantum well layer 46W3c may be lower than energy levels of the first and fifth sub-quantum well layers 46W3a and 46W3e. Energy levels of the second and fourth sub-quantum well layer 46W3b and 46W3d may be higher than energy levels of the first and fifth sub-quantum well layers 46W3a and 46W3e and the third sub-quantum well layer 46W3c. The third sub-quantum well layer 46W3c may be, for example, an $In_{0.15}Ga_{0.85}As$ layer.

Figure 5:
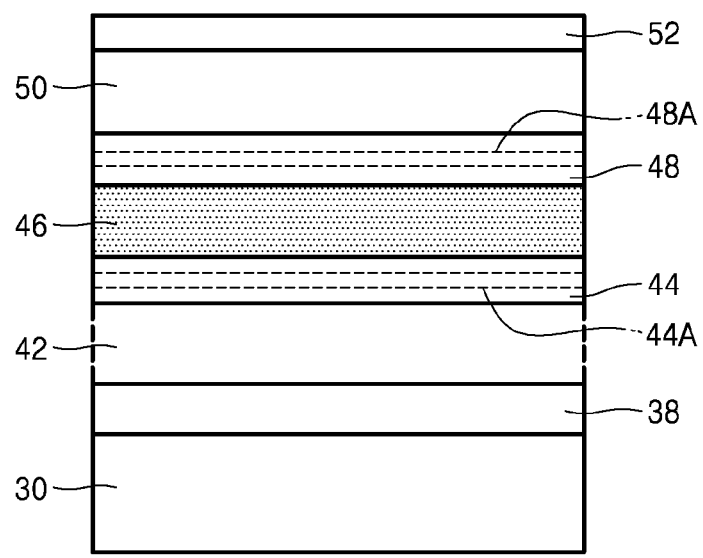
FIG. 5 is a cross-sectional view illustrating a doping area formed in a clad layer of FIG. 1.

FIG. 5 is a cross-sectional view illustrating the doping area (doping layer) formed outside the active layer 46.

Referring to FIG. 5, a lower doping area (doping area) 44A is included in the lower clad layer 44. Also, an upper doping area (doping area) 48A is included in the upper clad layer 48. While the upper and lower clad layers 48 and 44, as illustrated, respectively include the doping areas 48A and 44A, a doping area may also be included in only one of the clad layers, for example, only in the lower clad layer 44.

The doping areas 44A and 48A respectively included in the lower and/or upper clad layers 44 and 48 are spaced apart from the active layer 46. Accordingly, as with a doping area included in quantum barrier layers of the active layer 46, when no voltage is applied, carriers are not supplied to the quantum well layer. Thicknesses and doping density ranges of the doping areas 44A and 48A of the lower and/or upper clad layers 44 and 48 may be in the same range as described above with respect to the doping areas included in the quantum barrier layers of the active layer 46.

Figure 6:
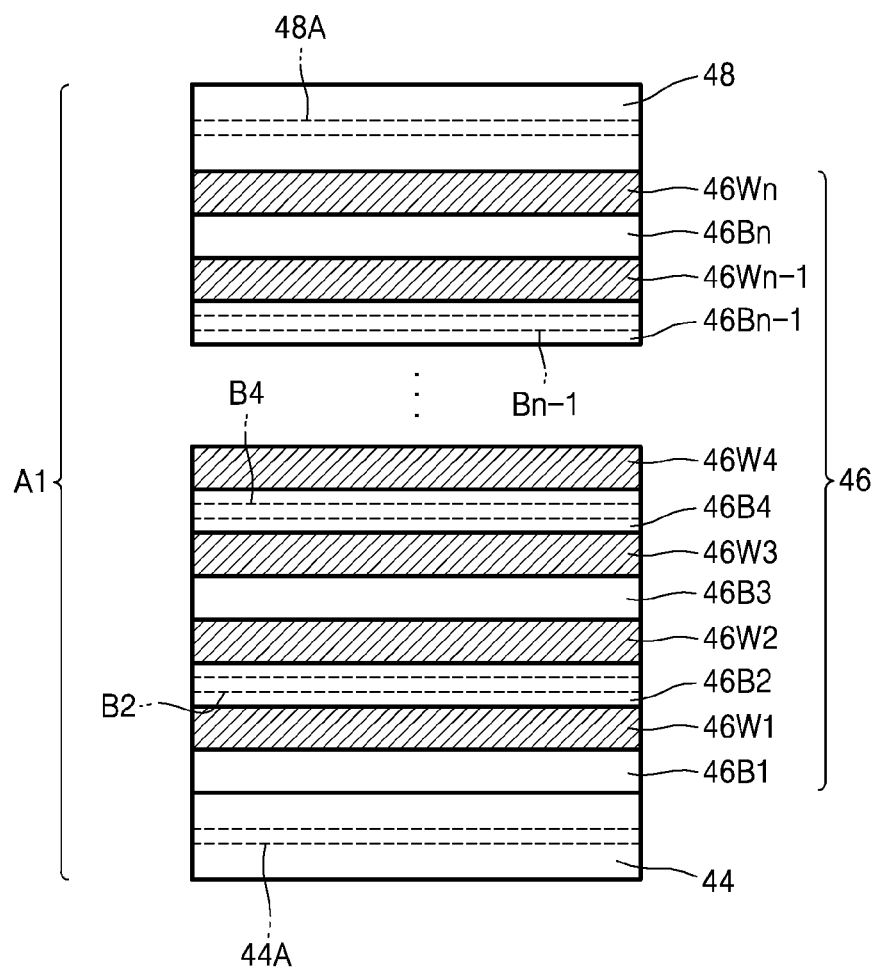
FIG. 6 is a cross-sectional view of a doping area formed in a quantum barrier layer and a clad layer of the optical modulator of FIG. 1.

FIG. 6 is a cross-sectional view of a doping area (doping layer) inside and outside the active layer 46.

Referring to FIG. 6, a lower doping area 44A and an upper doping area 48A are respectively included in the lower and upper clad layers 44 and 48. Also, doping areas B2, B4, Bn−1 are respectively formed in the second, fourth, and (n−1)th quantum barrier layers 46B2, 46B4 and 46Bn−1.

FIG. 6 may correspond to a combination of FIGS. 2 and 5.

Figure 7:
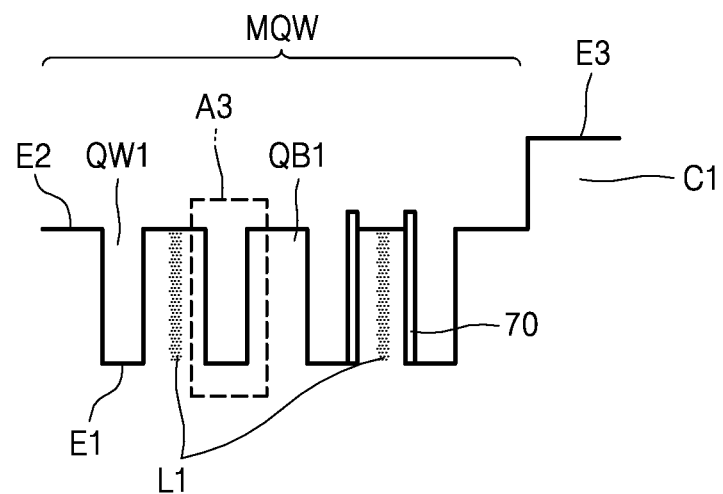
FIGS. 7 and 8 are energy band diagrams of an active layer of the optical modulator of FIG. 1.
Figure 8:
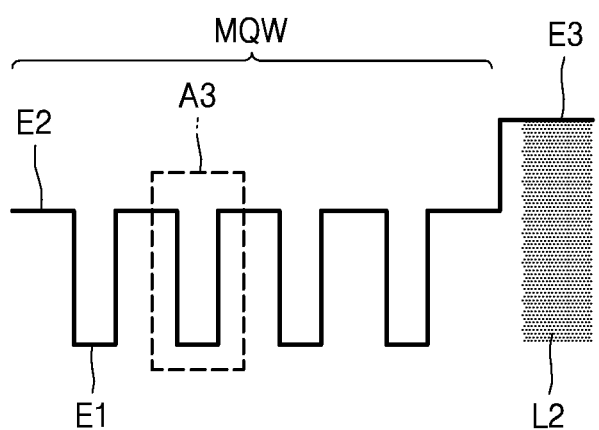

FIGS. 7 and 8 are energy band diagrams of the active layer 46 of FIG. 1.

Referring to FIG. 7, each quantum well QW1 in a MQW has a rectangular quantum well (RQW) structure. A doping area L1 is formed in a quantum barrier QB1 and is spaced apart from the quantum well QW1. E1 denotes an energy level of a quantum well, and E2 denotes an energy level of a quantum barrier QB1. E3 denotes an energy level of a clad C1.

A second quantum barrier 70 preventing contact between the quantum well QW1 and the quantum barrier QB1 may be formed on each side of the quantum barrier QB1, and the entire quantum barrier QB1 may be doped.

Referring to FIG. 8, the quantum well QW1 has an RQW structure, and a doping area L2 is formed in the clad C1.

Figure 9:
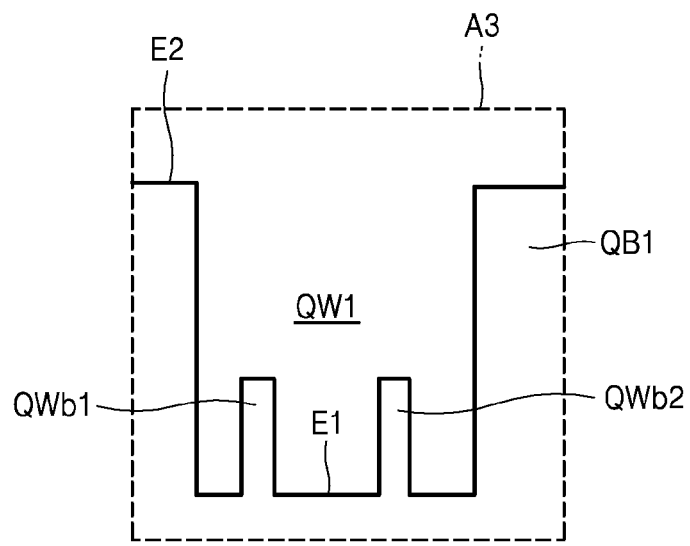
FIG. 9 is an extended cross-sectional view of a third area of FIG. 7.
Figure 10:
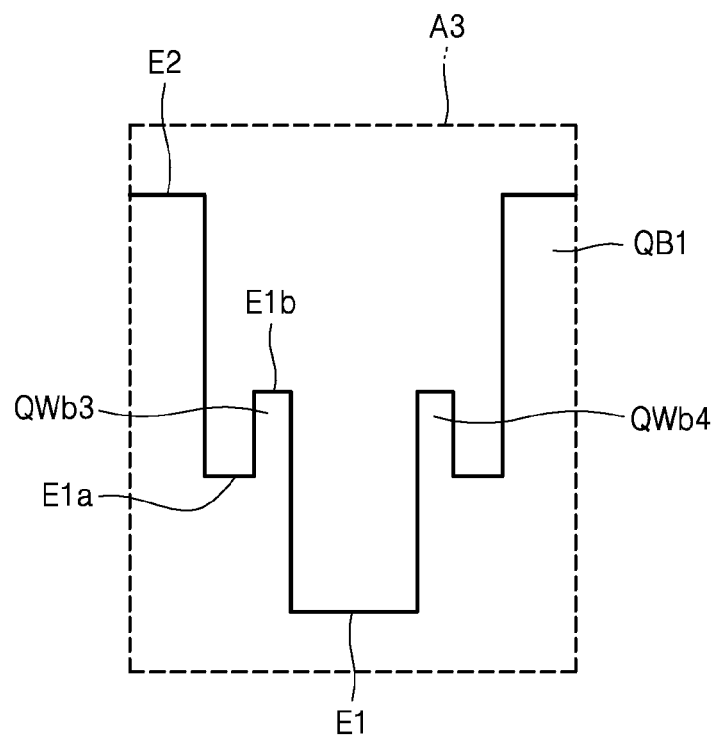
FIG. 10 is an extended cross-sectional view of a third area of FIG. 8.

FIGS. 9 and 10 are extended cross-sectional views of a third area A3 of FIGS. 7 and 8, respectively.

Referring to FIG. 9, first and second sub-quantum barriers QWb1 and QWb2, which are separated from each other, are formed in the quantum well QW1. Energy levels of the first and second sub-quantum barriers QWb1 and QWb2 are lower than that of the quantum barrier QB1 that is adjacent thereto. The first and second sub-quantum barriers QWb1 and QWb2 are spaced apart from the adjacent quantum barrier QB1. In the quantum well QW1, an energy level between the first and second sub-quantum barriers QWb1 and QWb2 and an energy level between the first and second sub-quantum barriers QWb1 and QWb2 and the quantum barrier QB1 are the same. Thus, the quantum well QW1 of FIG. 9 has a 3-coupled quantum well (3CQW) structure.

Referring to FIG. 10, a second quantum well QW2 which is different from the quantum well QW1 of FIG. 9 is formed between quantum barriers QB1. The second quantum well QW2 includes third and fourth sub-quantum barriers QWb3 and QWb4. The third and fourth sub-quantum barriers QWb3 and QWb4, that are spaced apart from each other, have the same height and are spaced apart from an adjacent quantum barrier QB1. Energy levels of the third and fourth sub-quantum barriers QWb3 and QWb4 are lower than that of the adjacent quantum barrier QB1. In the second quantum well QW2, an energy level E1 between the third and fourth sub-quantum barriers QWb3 and QWb4 is lower than an energy level E1a between the third and fourth sub-quantum barriers QWb3 and QWb4 and the quantum barrier QB1. Thus, the second quantum well QW2 of FIG. 10 has a 3-asymmetric-coupled quantum well (3ACQW) structure.

As illustrated in FIGS. 7 through 10, a quantum well layer of the active layer 46 of FIG. 1 may have any of various quantum well structures.

FIGS. 11 through 17 are graphs showing results of experiments related to light absorption of embodiments of the transmission type optical modulator described above.

Figure 11:
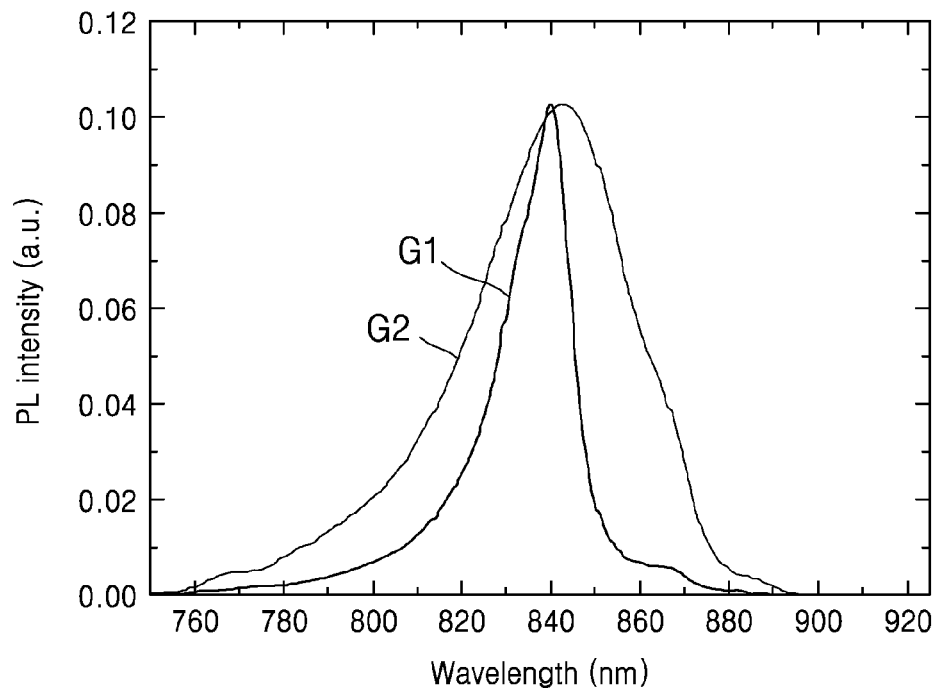
FIGS. 11 through 17 are graphs showing experimental results related to light absorption of an optical modulator according to an exemplary embodiment.

FIG. 11 shows a result of measuring photoluminescence (PL) to verify an increase in carriers after performing a MQW test in an 850 nm band. In the measurement, a MQW having a GaAs/AlGaAs 5-pair structure was used, and a p-type doping layer having a thickness of 1 nm was formed in each quantum barrier layer. Also, to prevent diffusion of carriers into the quantum well layer, an intrinsic layer having a predetermined thickness was disposed around the doping layer.

In FIG. 11, a horizontal axis denotes a wavelength of incident light, and a vertical axis denotes PL intensity. In FIG. 11, a first graph G1 denotes a PL intensity when no doping layer is included in the quantum barrier layer, and a second graph G2 denotes a PL intensity when a doping layer is included in the quantum barrier layer.

When comparing the first and second graphs G1 and G2 of FIG. 11, a bandwidth of the second graph G2 has increased due to the carriers supplied from the doping layer, and this indicates an increase in light absorption efficiency.

Figure 12:
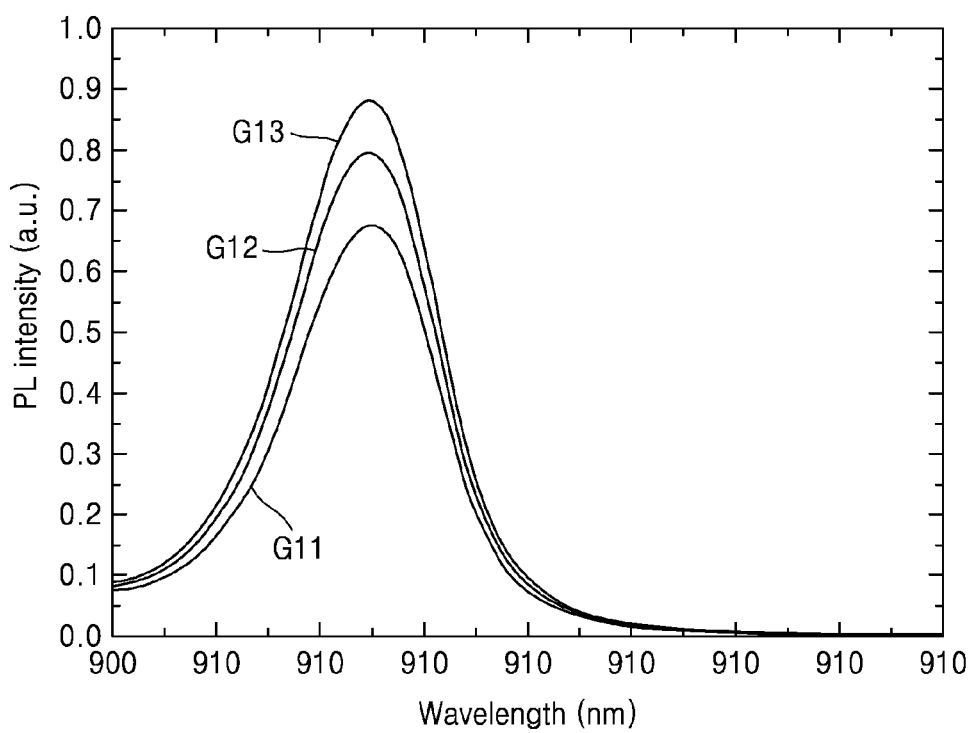

FIG. 12 shows a result of an experiment of verifying a carrier increase through measuring PL after performing a MQW test in a 940 nm band. In the experiment, an InGaAs/GaAsP 5-pair MQW structure was used as the active layer 46, and a first sample including a quantum barrier layer (GaAsP), in which a doping layer having a thickness of 1 nm was applied, and a second sample, in which a doping layer was applied in a clad layer, were used. Also, a third sample not including a doping layer was used for comparison. A doping density of the doping layer was about $\sim 1\times 10^{17}/cm^3$.

In FIG. 12, a horizontal axis denotes a wavelength of incident light and a vertical axis denotes a PL intensity.

In FIG. 12, a first graph G11 denotes a result of the third sample, and a second graph G12 denotes a result of the second sample, and a third graph G13 denotes a result of the first sample.

When comparing the first through third graphs G11, G12, and G13 of FIG. 12, the first sample has the highest PL intensity, and the third sample has the lowest PL intensity. This result suggests that when the number of pairs of quantum well layer/quantum barrier layer included in the active layer 46 is small, even when a doping layer is included in a quantum barrier layer or a clad layer, light absorption efficiency may be increased due to an increase in carriers.

Figure 13:
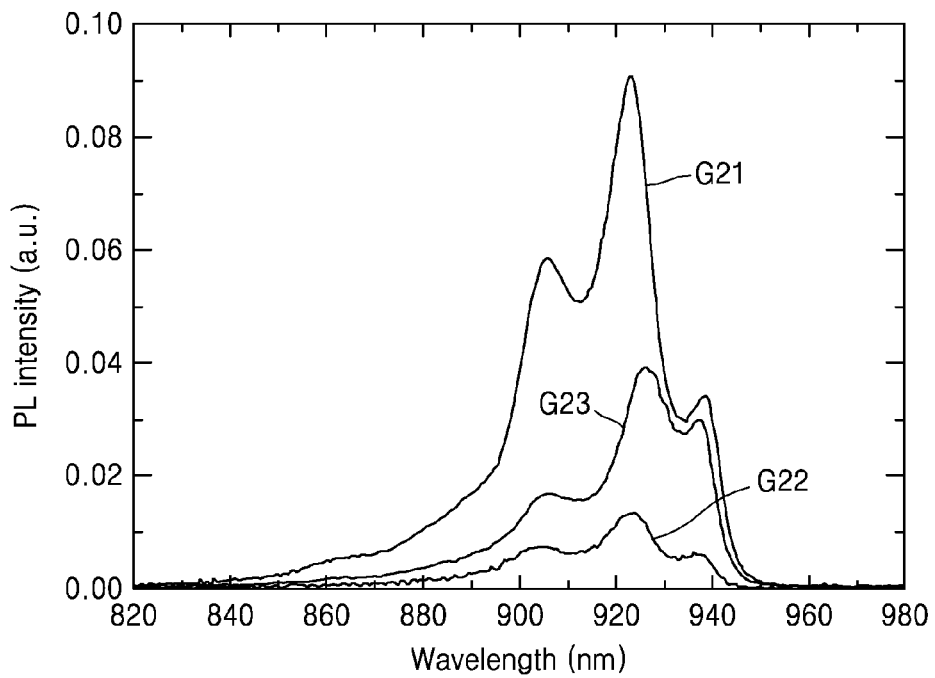

FIG. 13 shows a result of an experiment in which a 940 nm MQW structure (98-pairs) was used, and a first sample including a quantum barrier layer, on which an n-type doping layer was formed, a second sample including a clad layer, on which an n-type doping layer was formed, and a third sample which did not include a doping layer were prepared and PL of each sample was measured. In the experiment, a density of the doping layer was $5 \times 10^{16}/cm^2$.

In FIG. 13, a horizontal axis denotes a wavelength of incident light and a vertical axis denotes a P1 intensity.

In FIG. 13, a first graph G21 denotes a result of the first sample, and second and third graphs G22 and G23 respectively denote results of the second and third samples.

Referring to the first through third graphs G21, G22, and G23 of FIG. 13, when a doping layer is formed on a quantum barrier layer, the highest P1 intensity is obtained, and light absorption efficiency is increased.

Figure 14:
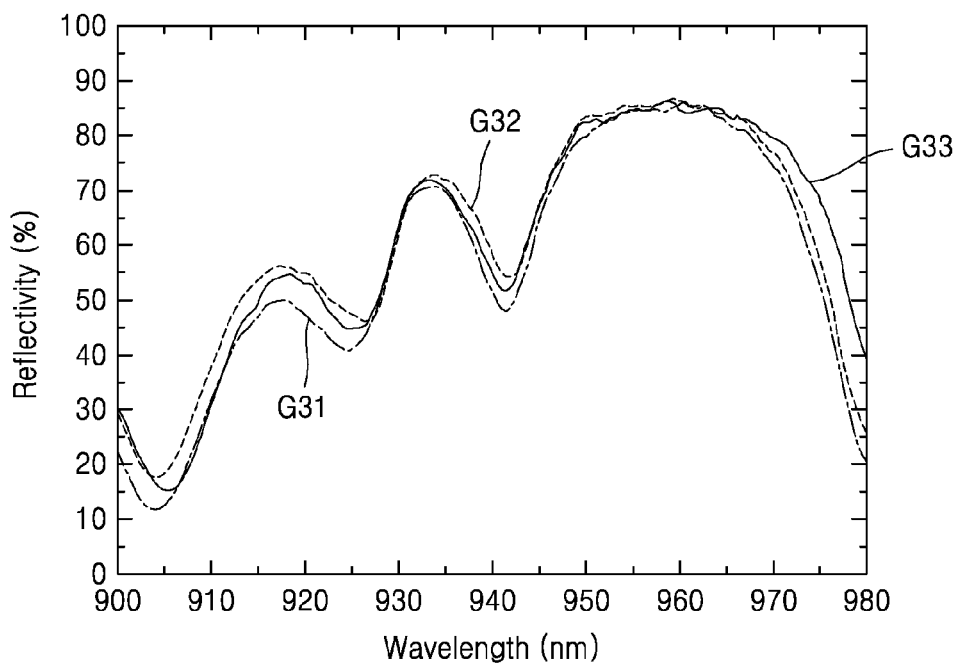

FIG. 14 shows a result of measuring light reflectivity for the first through third samples used to obtain the result of FIG. 13.

In FIG. 14, a horizontal axis denotes a wavelength of incident light and a vertical axis denotes a light reflectivity.

In FIG. 14, a first graph G31 denotes a result of the first sample, and second and third graphs G32 and G33 respectively denote results of the second and third samples.

Referring to the first through third graphs G31, G32, and G33, light reflectivity is the lowest when a doping layer is formed on a quantum barrier layer.

Figure 15:
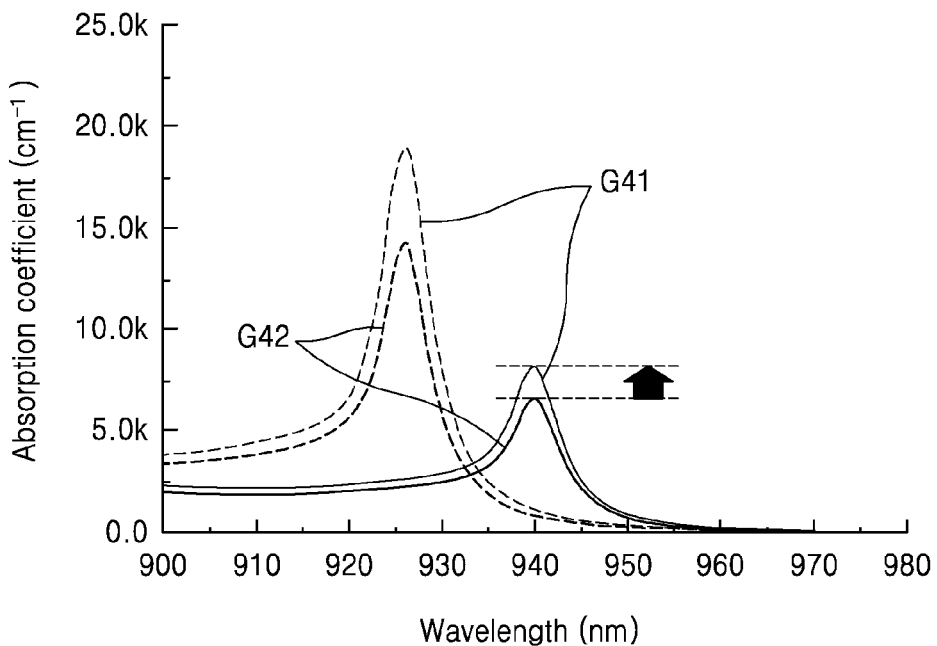

FIG. 15 shows a result of an experiment about an absorption coefficient.

The experiment was performed with respect to the first and second samples.

In both of the first and second samples, the active layer 46 had a 3CQW MQW structure. Also, a $GaAs_{0.6}P_{0.4}$ layer was used as a quantum barrier layer. Also, a quantum well layer having a 3CQW structure was formed by sequentially stacking an $In_{0.08}Ga_{0.92}As$ layer, a GaAs layer, an $In_{0.15}Ga_{0.85}As$ layer, a GaAs layer, and an $In_{0.08}Ga_{0.92}As$ layer. Also, the quantum well layer had a thickness of 5.1 nm, and the quantum barrier layer had a thickness of 6.1 nm. In the first sample, a doping layer having a thickness of 0.7 nm was formed in the quantum barrier layer, but no doping layer was formed in the second sample. A doping density of the doping layer in the first sample was $3 \times 10^{17}/cm^3$.

In FIG. 15, a horizontal axis denotes a wavelength of incident light and a vertical axis denotes an absorption coefficient.

In FIG. 15, a first graph G41 denotes a result of the first sample, and a second graph G42 denotes a result of the second sample.

Referring to the first and second graphs G41 and G42 of FIG. 15, an absorption coefficient of the first sample was greater than an absorption coefficient of the second sample. The only difference between the first and second samples is whether a doping layer is included or not. Thus, the result of FIG. 15 suggests that a carrier supply is increased due to the doping layer and light absorption has increased due to the increased carrier supply.

Figure 16:
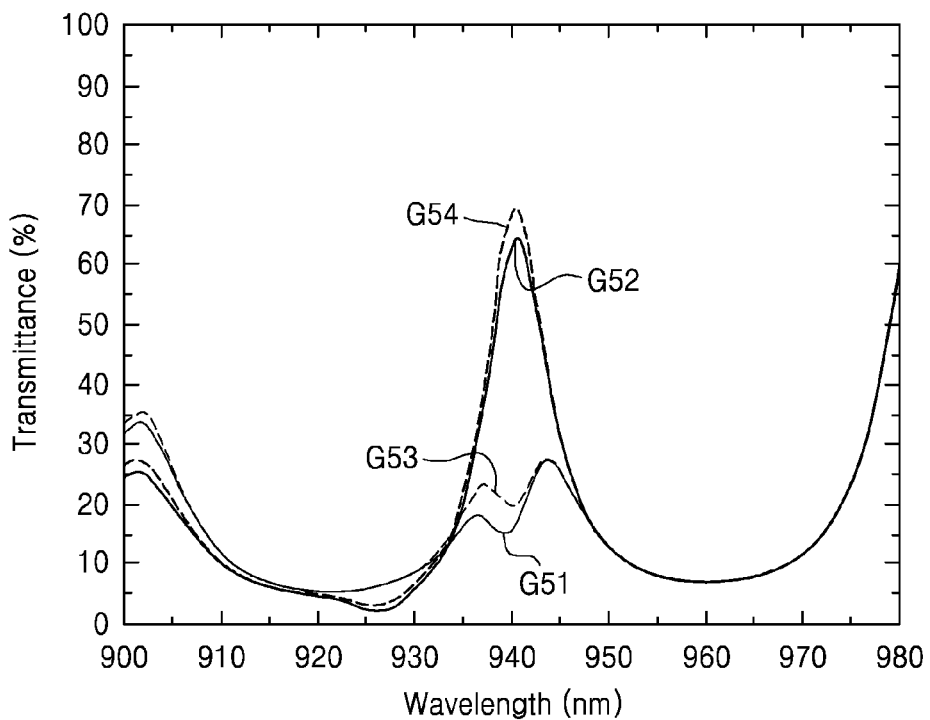

FIG. 16 shows a result of measuring a light transmittance for the first and second samples used to obtain the result of FIG. 15.

In FIG. 16, a horizontal axis denotes a wavelength of incident light and a vertical axis denotes light transmittance. In FIG. 16, first and second solid-line graphs G51 and G52 denote the light transmittance of the first sample, and first and second dotted-line graphs G53 and G54 denote light transmittance of the second sample. The first solid-line graph G51 and the first dotted-line graph G53 denote light transmittance of when an operating voltage of 6.5 V was applied to the first and second samples. The second solid-line graph G52 and the second dotted-line graph G54 denote light transmittance of when an operating voltage of 0 V was applied to the first and second samples.

As a voltage of 6.5V/mm was applied to the first and second samples, carriers were additionally supplied from a doping layer included in a quantum barrier layer of the first sample, and thus more carriers may be present in the active layer of the first sample than in the second sample. Accordingly, a light absorption efficiency of the first sample was higher than in the second sample as is shown in FIG. 15, and a light transmittance of the first sample was spontaneously lower than that of the second sample. FIG. 16 shows such a result. That is, when comparing the first solid-line graph G51 and the first dotted-line graph G53, when a wavelength of incident light is 940 nm, a light transmittance of the first sample was lower than that of the second sample.

When an operating voltage was applied to the first and second samples, a light transmittance Toff of the first sample was lower than that of the second sample, and thus, a demodulation ratio (DC) of the first sample was higher than that of the second sample which had no doping layer.

Meanwhile, a depth error of an optical modulator was in inverse proportion to the DC. As the DC of the first sample was greater than that of the second sample, a depth error of the first sample was smaller than that of the second sample.

That is, a depth error of the transmission type optical modulator was smaller than a depth error of a conventional optical modulator which has no doping layer. Thus, when a transmission type optical modulator according to exemplary embodiments is used, precise 3D depth images may be obtained.

Figure 17:
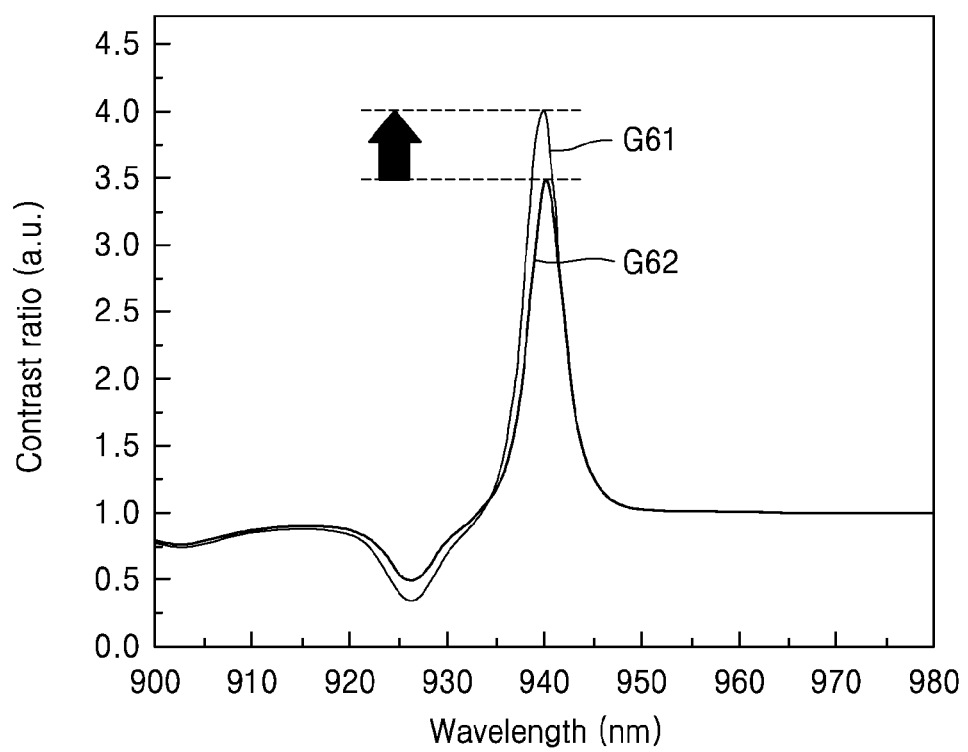

FIG. 17 shows a contrast ratio of the first and second samples used in obtaining the result of FIG. 15. An operating voltage of 6.5V/mm was applied to the first and second samples.

In FIG. 17, a horizontal axis denotes a wavelength of incident light, and a vertical axis denotes a contrast ratio (CR).

In FIG. 17, a first graph G61 shows a CR of the first sample, and a second graph G62 shows a CR of the second sample.

When comparing the first and second graphs G61 and G62 of FIG. 17, the CR of the first sample is greater than that of the second sample at 940 nm, and the CR of the first sample has increased from 3.5 to 4.0.

Next, a method of manufacturing the transmission type optical modulator will be described with reference to FIGS. 18 through 20. Like elements as those described with respect to the transmission type optical modulator will be labeled like reference numerals and additional description thereof will be omitted.

Figure 18:
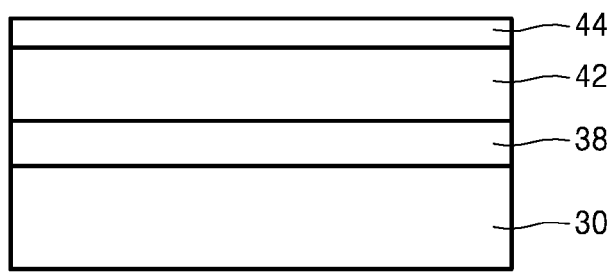
FIGS. 18 through 20 are cross-sectional views for illustrating a method of manufacturing an optical modulator according to an exemplary embodiment.

Referring to FIG. 18, a buffer layer 38 is formed on a substrate 30. A lower DBR layer 42 is formed on the buffer layer 38. Next, a lower clad layer 44 is formed on the lower DBR layer 42. The buffer layer 38, the lower DBR layer 42, and the lower clad layer 44 may be formed by using an epitaxial method. A contact layer may be formed under or on the buffer layer 38 to form an N-type electrode.

Figure 19:
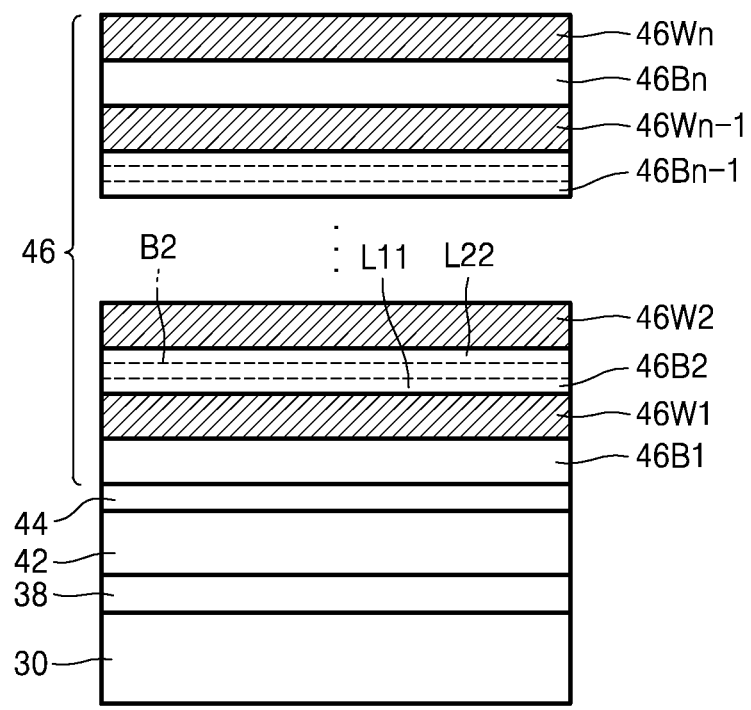

Referring to FIG. 19, an active layer 46, including a doping area (doping layer), is formed on the lower clad layer 44. The active layer 46 may be formed using an epitaxial method, and a component of a main material layer and a dopant may be supplied to form the doping area (doping layer) while forming the active layer 46.

An exemplary embodiment of forming the active layer 46 will be described in detail. First, a first quantum barrier layer 46B1 and a first quantum well layer 46W1 are sequentially stacked on the lower clad layer 44. The first quantum barrier layer 46B1 and the first quantum well layer 46W1 may be formed of compound semiconductor layers. The first quantum barrier layer 46B1 and the first quantum well layer 46W1 may be formed using an epitaxial method. A second quantum barrier layer 46B2 is formed on the first quantum well layer 46W1. The second quantum barrier layer 46B2 may be formed by sequentially forming a first layer L11, a doping layer B2, and a second layer L22. The first and second layers L11 and L22 may have the same composition as each other or may be intrinsic layers. The doping layer B2 may be a material layer that has the same composition as the first layer L11 and is doped with an n-type or p-type dopant. Accordingly, the doing layer B2 may be formed by forming a first layer L11 and then supplying a source gas that is supplied to form the first layer L11 and the p-type or n-type dopant together. After the doping layer B2 is formed, the supply of the source gas is maintained and the supply of the dopant is stopped, thereby forming the second layer L22 on the doping layer B2. The first and second layers L11 and L22 and the doping layer B2 may be formed using an epitaxial method. The doping layer B2 may also be formed on the first quantum barrier layer 46B1.

After forming the second quantum barrier layer 46B2, a second quantum well layer 46W2 is formed thereon. Next, the first quantum barrier layer 46B1 and the first quantum well layer 46W1 may be alternately and repeatedly stacked on the second quantum well layer 46W2. The number of times the first quantum barrier layer and the first quantum well layer are alternately stacked may be adjusted according to necessity. While alternately and repeatedly stacking layers, a doping layer may be formed on at least one quantum barrier layer using the same method as the method of forming the doping layer B2 on the second quantum barrier layer 46B2.

Figure 20:
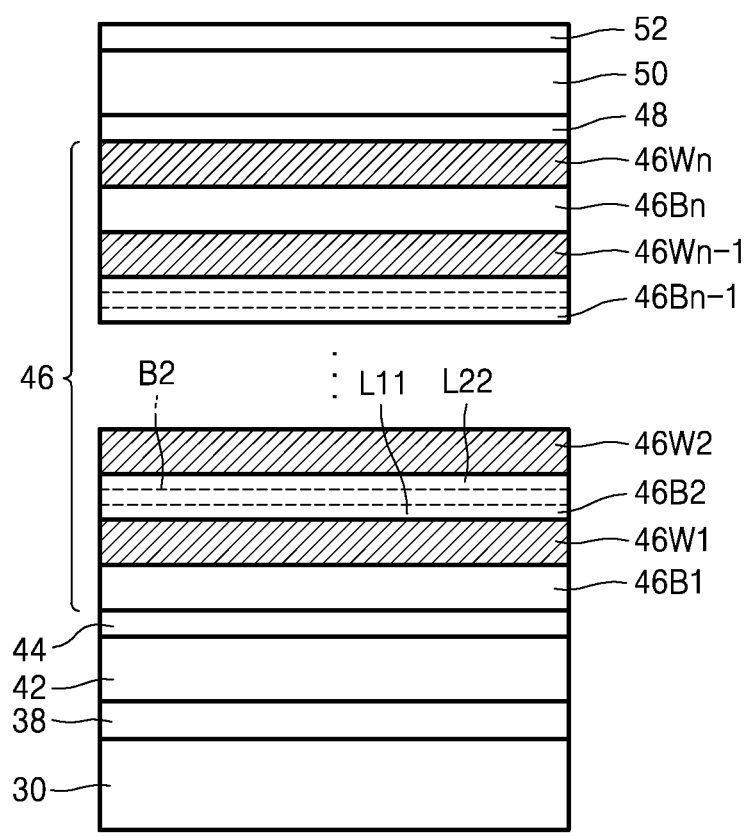

After forming the active layer 46 as described above, an upper clad layer 40 and an upper DBR layer 50 are sequentially stacked on the active layer 46 as illustrated in FIG. 20. The upper clad layer 40 and the upper DBR layer 50 may be formed using an epitaxial method. A contact layer 52 for contacting a P-type electrode may be formed on the upper DBR layer 50.

A doping layer may be formed in at least one of the lower clad layer 44 and the upper clad layer 48. A doping layer may or may not be formed in the active layer 46.

The optical modulator according to one or more of the above exemplary embodiments includes an additional doping area in an active layer (multi-quantum well layer) and/or a clad layer. When an operating voltage is applied to the optical modulator, carriers are supplied from the doping area to a quantum well layer of the active layer to thereby increase a light absorption efficiency as compared to when the doping area is not included. Accordingly, a light blocking operation of the optical modulator may be effectively conducted. In addition, a light transmittance Toff of the optical modulator at an on-voltage Von is lower in the related art, and thus, a contrast ratio and a demodulation ratio are improved with respect to the related art, and as a result, 3D image precision may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims.

What is claimed is:

1. A transmission type high-absorption optical modulator, comprising:
   a substrate;
   a lower distributed Bragg reflector (DBR) layer disposed on the substrate;
   a lower clad layer disposed on the lower DBR layer;
   an active layer disposed on the lower clad layer, wherein the active layer comprises at least one quantum well layer and at least one quantum barrier layer comprising a doping layer therewithin which supplies carriers to the at least one quantum well layer;
   an upper clad layer disposed on the active layer; and
   an upper DBR layer disposed on the upper clad layer.

2. The transmission type high-absorption optical modulator of claim 1, wherein the doping layer within the at least one quantum barrier layer is a first doping layer and at least one of the upper clad layer and the lower clad layer comprises a second doping layer therewithin.

3. The transmission type high-absorption optical modulator of claim 1, wherein the active layer is a multi-quantum well layer comprising a plurality of quantum well layers and a plurality of quantum barrier layers and comprising one of a rectangular quantum well, a 3-asymmetric-coupled quantum well, and a 3-coupled quantum well;
   wherein the 3-coupled quantum well is a quantum well in which an energy level between sub-quantum barriers is equal to an energy level between a quantum barrier and the sub-quantum barriers and the 3-asymmetric-coupled quantum well is a quantum well in which the energy level between the sub-quantum barriers is lower than the energy level between the quantum barrier and the sub-quantum barriers.

4. The transmission type high-absorption optical modulator of claim 1, wherein the at least one quantum barrier layer comprises a plurality of quantum barrier layers, each of the plurality of quantum barrier layers comprising a doping layer therewithin.

5. The transmission type high-absorption optical modulator of claim 1, wherein the doping layer has a thickness (t) in a range of 0<t<1.8 nm and does not contact the quantum well layer.

6. The transmission type high-absorption optical modulator of claim 1, wherein a doping density of the doping layer is from about $5 \times 10^{15}/cm^3$ to about $1 \times 10^{20}/cm^3$.

7. The transmission type high-absorption optical modulator of claim 1, wherein the doping layer is doped with a p-type dopant.

8. The transmission type high-absorption optical modulator of claim 1, wherein the doping layer is doped with an n-type dopant.

9. A method of manufacturing a transmission type high-absorption optical modulator, the method comprising:
- forming a lower distributed Bragg reflector (DBR) layer on a substrate;
- forming a lower clad layer on the lower DBR layer;
- forming, on the lower clad layer, an active layer comprising a quantum well layer and a quantum barrier layer, wherein the forming the quantum barrier layer comprises forming a first layer on the lower clad layer, forming a doping layer on the first layer, and forming a second layer on the doping layer;
- forming an upper clad layer on the active layer; and
- forming an upper DBR layer on the upper clad layer;
- wherein the doping layer supplies carriers to the quantum well layer.

10. The method of claim 9, wherein the doping layer formed on the first layer is a first doping layer, and at least one of the forming the lower clad layer and the forming the upper clad layer comprises forming a second doping layer therein.

11. The method of claim 9, wherein the doping layer is a layer doped with a P-type dopant.

12. The method of claim 9, wherein the doping layer is a layer doped with an N-type dopant.

13. The method of claim 9, wherein the forming the doping layer on the first layer comprises supplying one of a p-type and an n-type dopant onto the first layer together with a source gas used in the forming the first layer.

14. The method of claim 9, wherein the active layer is a multi-quantum well layer including a plurality of quantum well layers and a plurality of quantum barrier layers and comprising one of a rectangular quantum well, a 3-asymmetric-coupled quantum well, and a 3-coupled quantum well.

15. The method of claim 14, wherein the method further comprises forming the doping layer in at least two of the plurality of quantum barrier layers.

16. The method of claim 9, wherein the doping layer has a thickness (t) in a range of $0<t<1.8$ nm and does not contact the quantum well layer.

17. The method of claim 9, wherein a doping density of the doping layer is from about $5\times10^{15}/cm^3$ to about $1\times10^{20}/cm^3$.

* * * * *